United States Patent
Li et al.

(10) Patent No.: US 7,106,727 B2
(45) Date of Patent: Sep. 12, 2006

(54) METHOD AND APPARATUS FOR PROVIDING CIRCUIT AND PACKET-SWITCHED CALLS ON A NETWORK

(75) Inventors: Zhian Li, Plainfield, IL (US);
ZhongJin Yang, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 936 days.

(21) Appl. No.: 10/027,761

(22) Filed: Dec. 21, 2001

(65) Prior Publication Data

US 2003/0118000 A1 Jun. 26, 2003

(51) Int. Cl.
*H04L 12/66* (2006.01)
(52) U.S. Cl. ........................................ 370/353
(58) Field of Classification Search ........ 370/352–353, 370/355–356
See application file for complete search history.

(56) References Cited

U.S. PATENT DOCUMENTS

| | | | | |
|---|---|---|---|---|
| 4,392,222 A | * | 7/1983 | Ando | 370/352 |
| 4,491,947 A | * | 1/1985 | Frank | 370/323 |
| 4,556,972 A | * | 12/1985 | Chan et al. | 370/354 |
| 4,569,041 A | * | 2/1986 | Takeuchi et al. | 370/352 |
| 5,327,428 A | * | 7/1994 | Van As et al. | 370/353 |
| 6,738,350 B1 | * | 5/2004 | Gao et al. | 370/232 |
| 6,882,640 B1 | * | 4/2005 | Berger et al. | 370/353 |

* cited by examiner

*Primary Examiner*—Chau Nguyen
*Assistant Examiner*—Kerri M. Dyke

(57) ABSTRACT

A method of providing circuit-switched and packet-switched calls on a single network comprises receiving (301), at a local switch, a plurality of calls that are comprised of at least one packet-switched call and at least one circuit-switched call and determining (305) a measure of the plurality of calls. Based on the measure of the plurality of calls, a first set of resources (117), from a plurality of resources between the local switch and a network switch, is allocated to circuit-switched calls, and a second set of resources (121), from the plurality of resources between the local switch and the network switch, is allocated to packet-switched calls.

19 Claims, 5 Drawing Sheets

METHOD AND APPARATUS FOR PROVIDING CIRCUIT AND PACKET-SWITCHED CALLS ON A NETWORK

FIELD OF THE INVENTION

This invention relates to communication systems or networks, including but not limited to packet-switched and circuit-switched communication networks.

BACKGROUND OF THE INVENTION

Two known formats for transporting data in communications networks are circuit-switched and packet-switched. Circuit-switched networks are more reliable than packet-switched networks for real-time applications and those requiring a guaranteed quality of service, such as voice and video, whereas packet-switched networks are more efficient at transmitting data, including email and internet data exchange applications. Circuit switching is used in traditional voice telephone technologies. Packet switching has emerged as the preferred method for data technologies, such as computer-to-computer communications.

Resources are dedicated for circuit-switched calls when the call is set up and remain assigned until the call is completed. Circuit-switched calls have end-to-end resources with a fixed bandwidth allocated for the entire call and typically do not need information, such as headers, above Layer 1. Circuit-switched calls tend to be more expensive because of dedicated bandwidth. Typically, circuit-switched resources are required even during silent periods when no information is being exchanged.

Resources, including bandwidth, are not dedicated for packet-switched calls. The information content of packet-switched calls is divided into packets that are routed based on their destination and repackaged at intermediate network elements for transmission. Packet-switched calls require sending of information, such as headers, above Layer 1 to determine the destination and/or path for the data. When the network becomes overburdened, packets may be buffered in network elements and/or dropped. Buffering causes transmission delays, possible receipt of packets out of order, and packet loss and results in deterioration of quality in real-time applications. For non-real-time applications, packets received out of order may be reordered by a higher layer protocol, and retransmission of missing packets upon request is employed by standard higher layer packet protocols. For non-real-time applications, delays due to retransmission and reordering of packets are acceptable, but such delays may severely affect the quality of service for real-time applications. Packet-switched calls cannot provide a guaranteed level of quality for real-time applications, and the quality deteriorates as traffic in the network increases. Packet-switched calls tend to be less expensive than circuit-switched calls because of sharing of available resources and bandwidth.

Today's networks are designed either exclusively for circuit switching or exclusively for packet switching. A network service provider typically builds two separate networks, a circuit-switched network for voice calls and a packet-switched network for data calls. Thus, e-mail is sent over the packet-switched network, because sending an email over a circuit switched network is wasteful, and voice calls are sent over the circuit-switched network, because sending a voice call over a packet-switched network results in poor quality of service, marked by distortions or gaps. Supporting and operating two separate networks increases the cost and complexity of today's networks.

Multi-media transmissions over today's networks also have drawbacks. When circuit-switched networks are utilized for multi-media calls, bandwidth is wasted when resources are assigned to accommodate worst case conditions, such as video. Thus, when data is transmitted, much unused bandwidth results, causing circuit-switched calls to be expensive. When packet-switched networks are utilized for multi-media calls, real-time applications such as voice and especially video suffer from missing data, and transmissions tend to have longer delays and poorer quality. In addition, with either network, resources are typically assigned at a fixed bandwidth, and when one part or session of a multi-media call exceeds its bandwidth, that part is either cut off or takes over resources for another part of the call, causing that part of the call to experience reduced quality.

Accordingly, there is a need for a better method and apparatus to utilize circuit-switched and packet-switched technologies, and additionally a better way to handle multi-media calls is needed.

SUMMARY

A method of providing circuit-switched and packet-switched calls on a single network comprises receiving, at a local switch, a plurality of calls that are comprised of at least one packet-switched call and at least one circuit-switched call and determining a measure of the plurality of calls. Based on the measure of the plurality of calls, a first set of resources, from a plurality of resources between the local switch and a network switch, is allocated to circuit-switched calls, and a second set of resources, from the plurality of resources between the local switch and the network switch, is allocated to packet-switched calls.

DESCRIPTION OF A PREFERRED EMBODIMENT

The following describes an apparatus for and method of utilizing a single network to transport both circuit-switched and packet-switched calls. Dynamic allocation of circuit-switched and packet-switched resources is provided. As a measure of a plurality of resources required for packet-switched and circuit-switched calls varies with time, the allocation of resources between network switches and local switches, and between network switches, are dynamically modified. A method of placing multi-media calls over the circuit-packet network is also provided.

Figure 1:
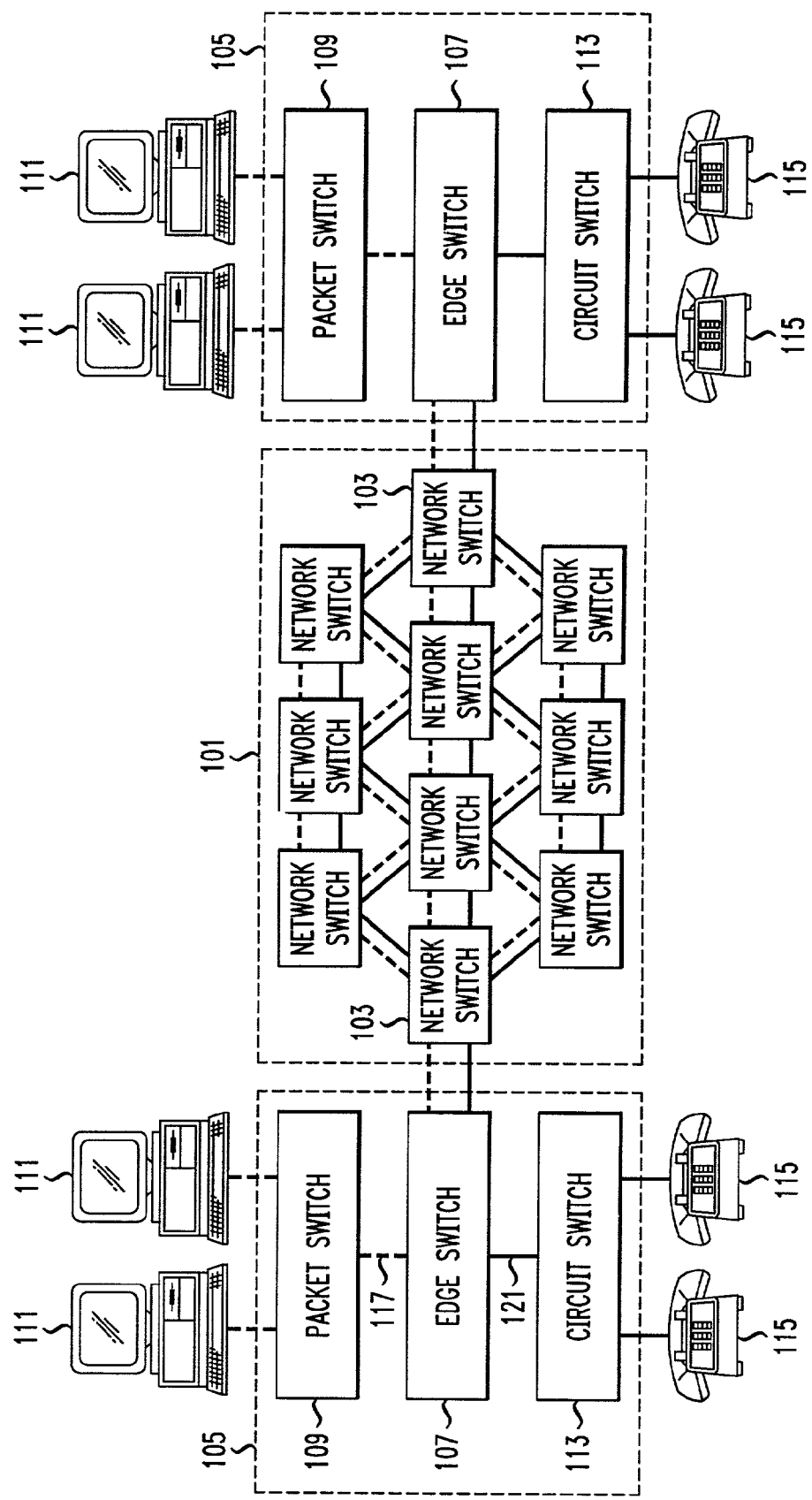
FIG. 1 is a block diagram of a communication network with circuit-switched resources and packet-switched resources in accordance with the invention.

A block diagram of a communication network supporting both circuit-switched resources and packet-switched resources is shown in FIG. 1. The communication network comprises a plurality of interconnected network switches 103 in a network 101, access networks 105, and network resources, including circuit-switched resources and packet-switched resources. The network switches 103 allocate and reallocate the resources linking the switches 103 between circuit-switched resources and packet-switched resources. Although a particular number of network switches 103 and pattern of interconnections between them is shown in FIG. 1, any number of network switches 103 and any pattern of interconnections may be utilized while successfully practicing the present invention. A number of physical resources, such as OC3 connections, OC12 connections, OC48 connections, OC192 connections, T1/E1 connections, T3/E3 connections, and so forth, which may be defined according to a number of protocols such as SONET (Synchronized Optical Network) and SDH (Synchronized Digital Hierarchy) as known in the art, are allocated between the network switches 103 and the access networks 105. Any type of resource, either wireless or wireline, copper or fiber optic, and so forth may be utilized to practice the various embodiments of the invention. Advantageously, both circuit-switched and packet-switched resources are provided between each pair of switches, and each physical resource is capable of handling circuit-switched and packet-switched formats.

One or more access networks 105 are interconnected to the network switches 103. An access network 105 may comprise one or more local switches and/or additional infrastructure, including one or more packet switches 109 and one or more circuit switches 113. The access network 105 typically includes an edge switch 107, also known as an access switch or gateway, that directs calls between the network switches 103 and one or more packet switches 109 and one or more circuit switches 113. The edge switch 107 has a processor that determines traffic distributions or patterns for packet-switched and circuit-switched calls and allocates and dynamically reallocates resources (e.g., those resources linking the access network 105 and a network switch 103) between circuit-switched and packet-switched resources. Thus, the edge switch 107 is able to provide dynamic provisioning of resources between circuit-switched and packet-switched and visa versa. The edge switch 107 is able to provide a single point of control for a call and to allocate and reallocate resources as needed or desired. One or more edge switches 107 may serve an access network or central office.

Packet-switched calls enter the network, for example, via computers 111 and other types of data terminals, and are transferred to the edge switch 107 by one or more packet switches 109 that receive the calls. Packet-switched resources 117 are designated with dashed lines.

Circuit-switched calls enter the network, for example, via telephones 115 and other types of voice and/or video terminals, and are transferred to the edge switch 107 by one or more circuit switches 113 that receive the calls. Circuit-switched resources 121 are designated with solid lines.

Figure 2:
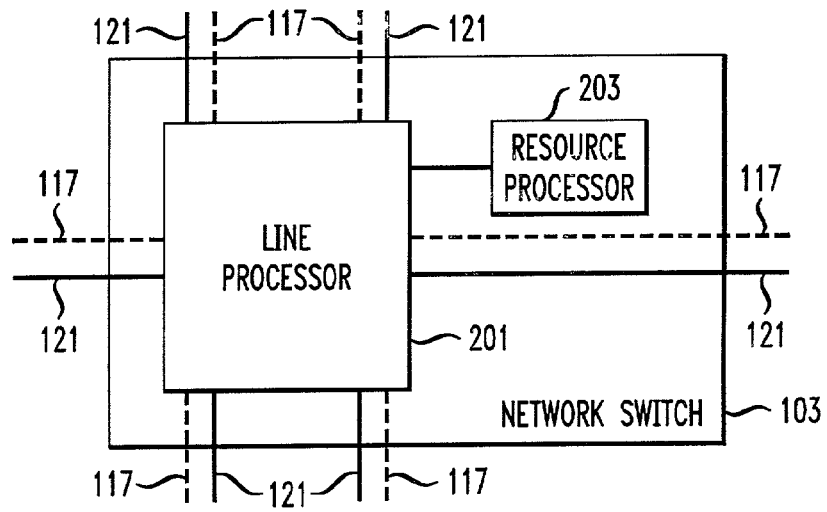
FIG. 2 is a block diagram of a network switch in accordance with the invention.

A block diagram of a network switch 103 is shown in FIG. 2. The network switch 103 comprises a line processor 201 that interfaces the circuit-switched resources 121 and the packet-switched resources 117 from the adjoining switches 103 and/or 107. The resource processor 203 allocates and reallocates the circuit-switched resources 121 and the packet-switched resources 117 to best meet the current traffic distribution of circuit-switched and packet-switched calls.

Allocation of resources in the network may be driven by either circuit-switched demands, packet-switched demands, or both. For example, traffic may be measured, e.g., by bit rate, for circuit-switched calls, resources sufficient to process the circuit-switched traffic are assigned as circuit-switched resources, and the remaining resources are allocated as packet-switched resources. In this way, the communication network guarantees the bandwidth demanded for circuit applications by reducing the resources currently allocated for packet switching when the resources allocated for circuit applications are not sufficient. Alternatively, traffic may be measured for packet-switched calls, and resources sufficient to process the packet-switched traffic are assigned as packet-switched resources, and the remaining resources are allocated as circuit-switched resources. Likewise traffic may be measured according to both circuit-switched calls and packet-switched calls, and resources are allocated accordingly.

Figure 3:
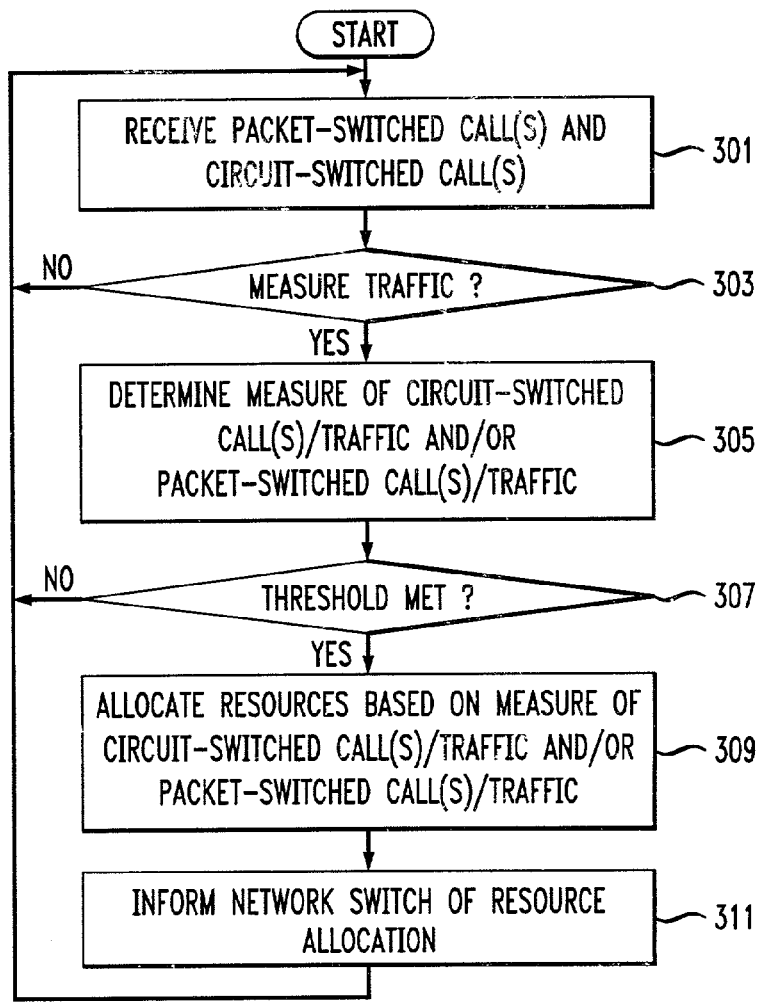
FIG. 3 is a flowchart showing a method of allocating circuit-switched resources and packet-switched resources in accordance with the invention.

A flowchart showing a method of allocating circuit-switched resources and packet-switched resources is shown in FIG. 3. At step 301, packet-switched call(s) and circuit-switched call(s) are received at the access network 105, for example, by a packet switch 109, a circuit switch 113, and/or edge switch 107. The calls may originate and/or terminate at the access network 105.

Traffic is measured periodically or on demand, for example, at the edge switch 107. When traffic is to be measured at step 303, the process continues with step 305, where a measure of calls received at step 301 is determined. The measure of calls includes a measure of circuit-switched traffic (in bits per second), a measure of packet-switched traffic (in bits per second), a distribution of traffic between circuit-switched and packet-switched (e.g., by %), a measure of circuit-switched calls (e.g., a count of current circuit-switched calls), a measure of packet-switched calls (e.g., a count of current packet-switched calls), a distribution of calls between circuit-switched and packet-switched (e.g., by % of total bandwidth), and any of measure of traffic or calls as known in the art. For example, traffic may be measured as 12 Mbps circuit-switched and 25 Mbps packet-switched or a percentage allocation between circuit and packet may be utilized, such as 60% circuit and 40% packet. Alternatively, a count of calls at the access network 105 by type may be utilized, such as 123 circuit calls and 68 packet calls. A further measure might be a division of the total number of resources by type, such as 96 circuit resources and 48 resources.

At step 307, it is determined whether a resource allocation threshold is met, i.e., whether a difference in traffic between a previous measure of traffic and the current measure of traffic is sufficient to reallocate resources between circuit-switched and packet-switched resources. For example, if the difference between bandwidth allocated for circuit traffic and the current demand for circuit traffic is greater that the resource allocation threshold, resources will be reallocated (or allocated if resources had not been previously allocated). If the threshold is not met, the process continues with step 301. If the threshold is met, the process continues with step 309, where resources are allocated, or reallocated, based on the current measure of traffic, i.e., packet-switched call(s) and circuit-switched call(s). For example, when resource allocation is circuit-switched driven, if 500 Mbps of circuit-switched resources are required, and 750 Mbps of total resources exist, ⅔ of the resources are allocated to circuit-switched calls.

At step 311, the access network 105, e.g., the edge switch 107, informs an adjacent network switch 103 of the resource allocation determined at step 309, and the process continues with step 301. At step 311, a negotiation process for the resources may be carried out, in which process it is possible that the resource allocation determined at step 309 may be denied. For example, the reallocation process may be as follows. The access network 105, e.g., the edge switch 107, may request reallocation of resources from an adjacent network switch 103. A procedure for performing a resource allocation change is executed between the edge switch 107 and the network switch 103, and the reallocation is performed. In this example, circuit-switched resources are to be reallocated as packet-switched resources. The reallocation procedure may include waiting for circuit switched resources to become available, e.g., unused by current traffic, and/or blocking of new calls while resources are changed to packet. Alternatively, the reallocation may be requested by the network switch 103. A similar reallocation process may occur between any pair of interconnected network elements 103. The network 101 may utilize a resource processor that administers or oversees the circuit and/or packet utilization in the entire network.

Figure 4:
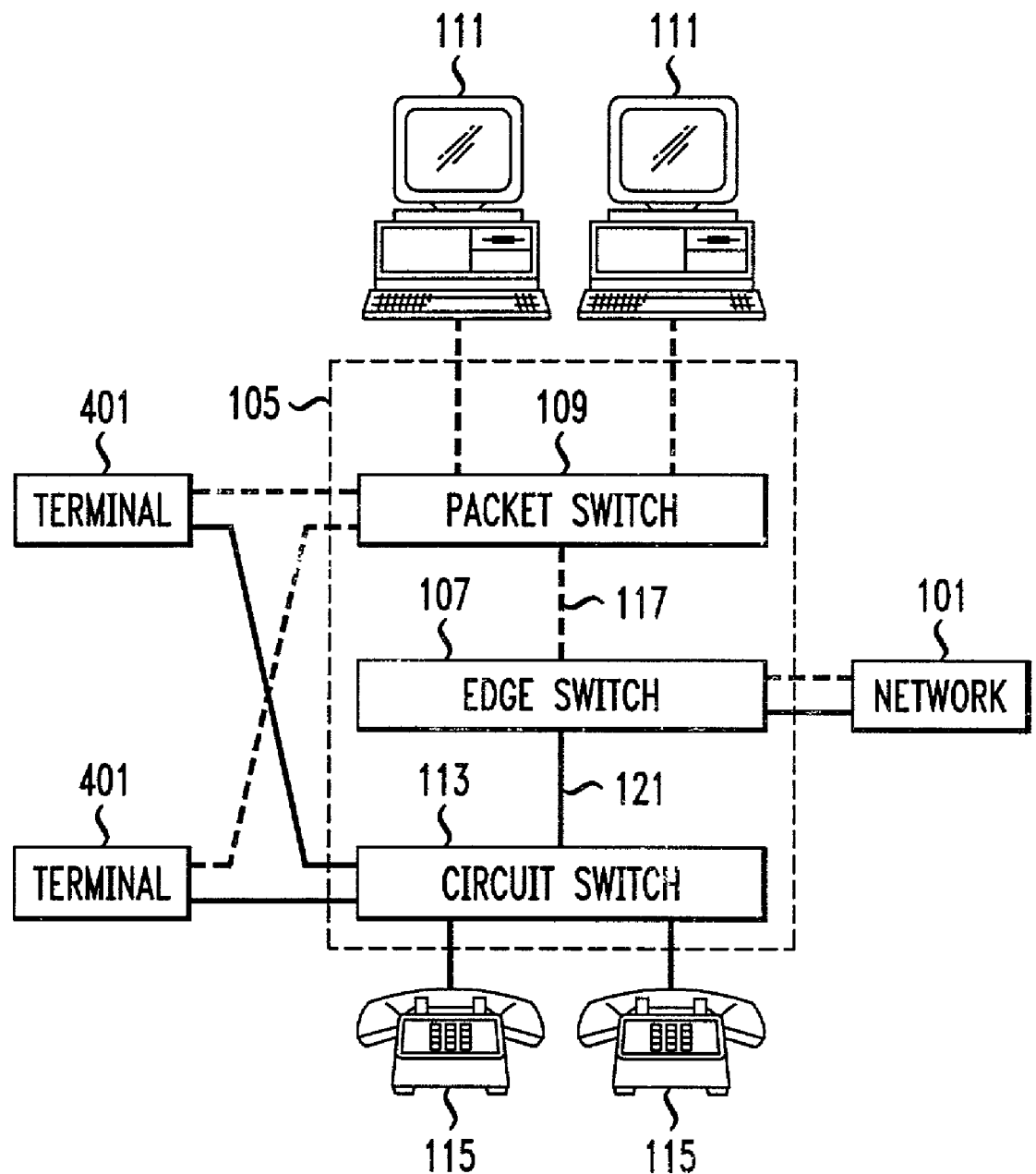
FIG. 4 is a block diagram of a local switch and its peripheral devices in accordance with the invention.

A block diagram of a local switch and its peripheral devices is shown in FIG. 4. The peripheral devices to the local switch include: computers 111 and other types of data terminals that communicate using packet-switched protocols; telephones 115 and other types of voice and/or video terminals that communicate using circuit-switched protocols; and terminals 401, such as multi-media gateways, that are capable of transmitting according to both packet-switched protocols and circuit-switched protocols and may transmit voice, data, and/or video. Any of the peripheral devices 111, 115, and/or 401 may be utilized to place a multi-media call.

Figure 5:
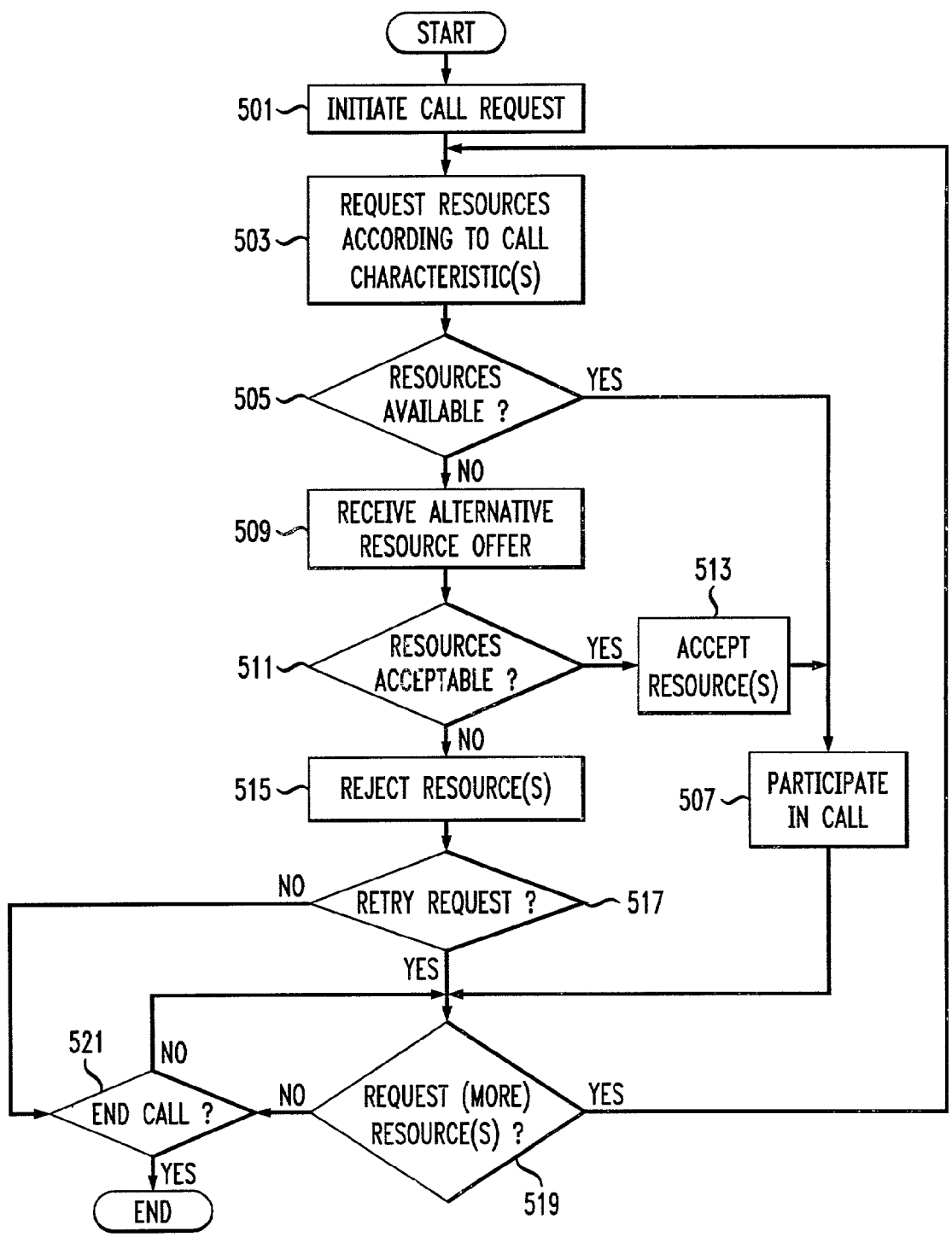
FIG. 5 is a flowchart showing a method of requesting resources for a call in accordance with the invention.

A flowchart showing a method of requesting resources for a call, such as a multi-media call, is shown in FIG. 5. At step 501, a user initiates a call request. The call request may originally be requested for one or more media and with one or more additional parties, and additional media and/or parties may be added (or deleted) later in the call. At step 503, the user requests resources according to call characteristic(s). The user may either select characteristics, such as quality of service, bandwidth, and time sensitivity, or may select communication types, such as voice, video, or data, which have these characteristics associated with them automatically or otherwise. When resources for the requested call are available at step 505, the process continues with step 507, where the user participates in the call.

When one or more resources requested for the call are not available at step 505, the process continues with step 509, where the user may be offered alternative resources, when such resources are available. When the offered alternative resources are acceptable to the user at step 511, the user accepts the resources at step 513 and participates in the call at step 507. When the offered alternative resources are not acceptable at step 511, the user rejects the resources at step 515, and the process continues with step 517. If at step 517 the user decides to retry the request for rejected resources, the process continues with step 519. If at step 517 the user decides not to retry the request for rejected resources, the process continues with step 521, where the user may elect to end the call.

At step 519, which may occur at any time during a call, the user, or any party to the call, may decide whether to request more resources for the call. The resources may be needed to add one or more additional parties to the call and/or may be utilized to provide additional capabilities between the existing parties. Examples of adding resources are as follows. Party A and Party B may be talking when Party A decides to send Party B a video. Upon viewing the video, Party B decides the forward the video to Party C. When Party C receives the video, Party C decides to send an email to Party A or Party B, asking to join their call. Once all the parties are connected, one of them may decide to share a data file by conference with each of the other parties. The parties may then decide to hold a video conference. Party C may then decide to drop out. When more resource(s) are decided to be requested for the call, the process continues with step 503. If the user decides to end the call at step 521, the process ends.

Figure 6:
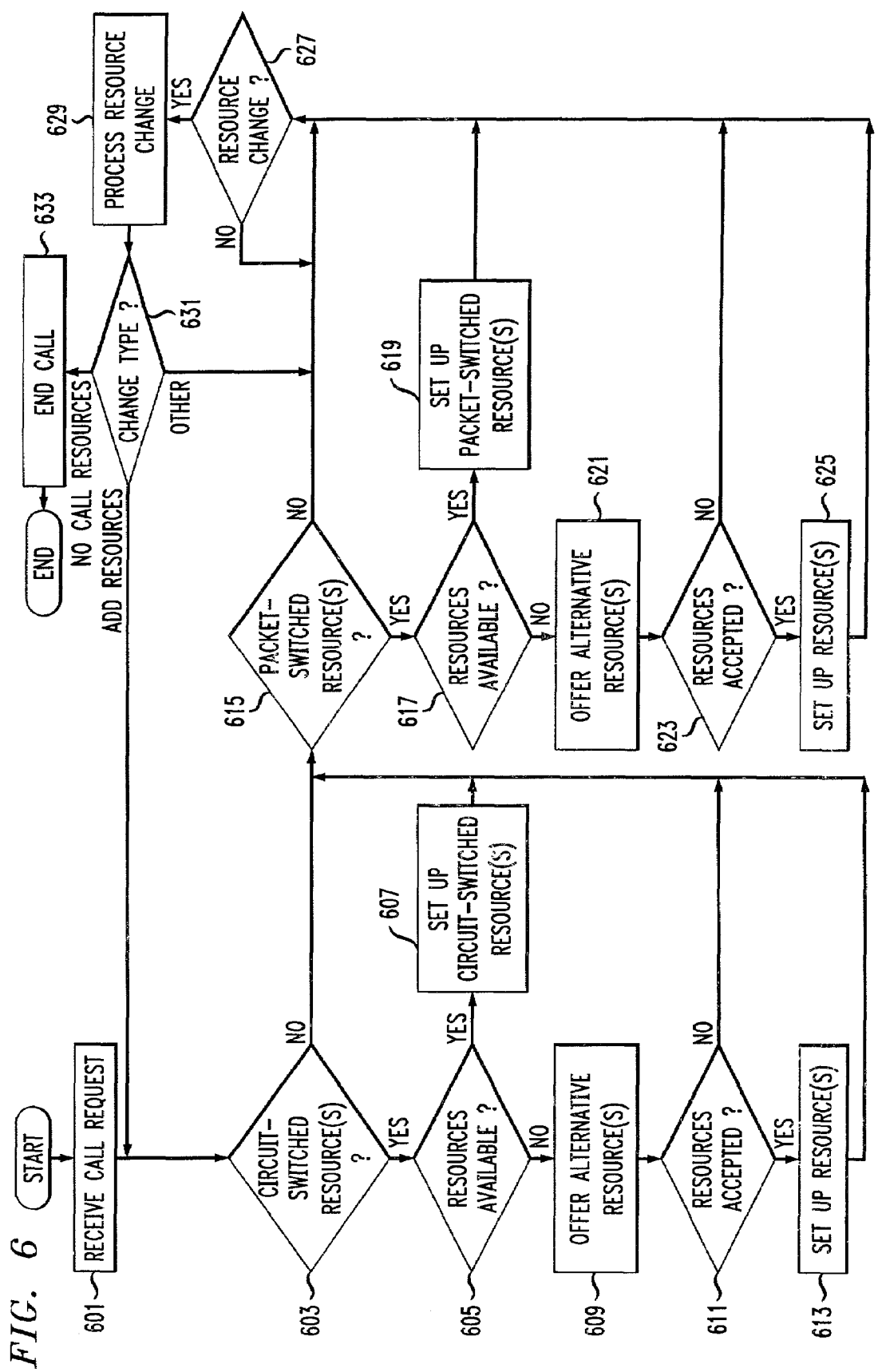
FIG. 6 is a flowchart showing a method of setting up circuit-switched resources and packet-switched resources for a call in accordance with the invention.

A flowchart showing a method of allocating circuit-switched resources and packet-switched resources for a call, such as a multi-media call, on a single network is shown in FIG. 6. A single point of control, for example the edge switch 107, for all parts of the multi-media call provides additional benefits such as the ability to reallocate network resources to make them available for the call, as well as the ability to allocate resources independently for different parts of the call. At step 601, a call request, or a type of resource request, is received from a user. The request may include the type of part(s) for the call, such as voice, video, and data, and/or requested call characteristics, such as quality of service, bandwidth, and time sensitivity (real-time or non-real-time connectivity). The request may automatically be assigned circuit- and/or packet-switched resources based on the type of session, part, or call characteristic, or the user may select between circuit- and/or packet-switched resources. At step 603, when circuit-switched resources are requested for the call, it is determined whether sufficient circuit-switched resources are available at step 605. When sufficient resources are available at step 605, the process continues with step 607, where one or more parts of the call are set up utilizing circuit-switched resource(s), and the process continues with step 615.

When sufficient resources are not available at step 605, the process continues with step 609, where alternative resource(s) are offered to the user. For example, if the user requested circuit-switched resources, e.g., real-time (time sensitive) resources, for video, but enough circuit-switched resources are unavailable, packet-switched resources, e.g., non-real-time resources, may be offered instead. The edge switch 107 may, at this time, decide to allocate more packet-switched resources to circuit-switched resources to meet the user's request, in which case the edge switch 107 would inform the network 101 of the reallocation, and the user's request is granted. The network 101 may not be able to reallocate resources, for example in times of high traffic, in which case the user would be offered alternative resources, if available.

When the alternative resources are not accepted by the user at step 611, the process continues with step 615. When the alternative resources are accepted by the user at step 611, the process continues with step 613, where the alternative resources are set up to complete this part of the call with the user, and the process continues with step 615.

When packet-switched resources are requested for the call at step 615, it is determined whether sufficient packet-switched resources are available at step 617. When sufficient resources are available at step 617, the process continues with step 619, where one or more parts of the call are set up utilizing packet-switched resource(s), and the process continues with step 627.

When sufficient resources are not available at step 617, the process continues with step 621, where alternative resource(s) are offered to the user. For example, if the user requested packet-switched resources. e.g., non-real-time resources, for video, but enough packet-switched resources are unavailable, circuit-switched resources, e.g., real-time resources, may be offered instead. When the alternative resources are not accepted by the user at step 623, the process continues with step 627. When the alternative resources are accepted by the user at step 623, the process continues with step 625, where the alternative resources are set up to complete this part of the call with the user, and the process continues with step 627.

At step 627, it is determined whether a resource change has been requested for the call. Resource changes include requests for additional/increased resources and deletion/reduction of resources. The user may request additional packet-switched resources and/or circuit-switched resources at any time during the call, for example to add one or more parties, to add voice, data, and/or video communications, and/or to increase bandwidth for current call parts. Likewise, the user may remove or request release of any resources from the call, for example, to discontinue communication with one or more parties, to discontinue one or more parts of the call that may be voice, data, and/or video communications, and/or to reduce bandwidth for current call parts.

When a resource change is detected at step 627, the process continues with step 629. At step 629, the resource change is processed, for example, by determining the nature of the resource change. If the resource change requests a reduction or deletion of resources, such resources are released or reduced according to the change request. When no resources remain in the call at step 631, the process continues with step 633, where the call is ended, and the process ends. When the resource change requires addition or increase of resources, the process continues with step 603. When the resource change does not result in the end of a call or addition/increase of resources at step 631, e.g., when resources are merely reduced for the call, the process continues with step 627.

The above flowcharts may be implemented as software code, i.e., computer readable program code, that is stored on a computer-readable signal-bearing medium as known in the art. The steps of the each flowchart may be performed by one device or distributed among two or more devices in the network.

Because both circuit-switched and packet-switched resources are available for allocation, and because these resources may be added to a call on demand (as available), various parts of a call, such as a multi-media call, need not take away resources already assigned to another part of the of the call. The call need not have a fixed bandwidth for the entire call either for the entire call or between any sets of parties. Because the various parts of a call may be appropriately assigned to circuit and/or packet resources, the overall quality of the call is greater, and each part of the call may be independent from the others, thus not interfering with the quality or other characteristics.

The above embodiments describe an allocation of resources between circuit-switched and packet-switched. The present invention may also be applied to additional types of resources, i.e., to allocate and reallocate resources between two or more types of resources.

The teachings herein give service providers the ability to offer both circuit-switched and packet-switched applications on one network to their customers without having to support to separate networks. When traffic patterns change, the network is able to dynamically reallocate resources between circuit and packet to better serve current demands. The circuit-packet network is used efficiently because, for example, unneeded circuit-switched resources are released or reallocated as packet-switched resources as the demand for circuit traffic decreases, and vice versa. Furthermore, service providers need to manage only one physical network, resulting in savings in network infrastructure and management (operation, administration, maintenance, and provision).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, at a local switch, a plurality of calls that are comprised of at least one packet-switched call and at least one circuit-switched call;
   determining a measure of the plurality of calls;
   based on the measure of the plurality of calls, allocating to the at least one circuit-switched call a first set of resources from a plurality of resources between the local switch and a network switch and allocating to the at least one packet-switched call a second set of resources from the plurality of resources between the local switch and the network switch, and wherein the first set of resources and the second set of resources are different.

2. The method of claim 1, wherein the measure of the plurality of calls is a measure of circuit-switched traffic.

3. The method of claim 1, wherein the measure of the plurality of calls is a measure of circuit-switched calls.

4. The method of claim 1, wherein the measure of the plurality of calls is a measure of packet-switched traffic.

5. The method of claim 1, wherein the measure of the plurality of calls is a measure of packet-switched calls.

6. The method of claim 1, further comprising the step of informing, by the local switch, the network switch of the allocation of the first set of resources and the second set of resources.

7. The method of claim 6, further comprising the step of allocating a plurality of network resources between packet-switched resources and circuit-switched resources based on the allocation of the first set of resources and the second set of resources, wherein the plurality of network resources link the network switch and at least one other switch.

8. The method of claim 1, further comprising the steps of:
   determining a second measure of the plurality of calls;
   when the second measure of the plurality of calls differs from first measure of the plurality of calls by a predetermined threshold, reallocating the plurality of resources between the local switch and a network switch between packet-switched resources and circuit-switched resources.

9. The method of claim 8, further comprising the steps of:
   informing, by the local switch, the network switch of the reallocation of the plurality of resources;

reallocating, by the network switch, a plurality of network resources between packet-switched resources and circuit-switched resources based on the reallocation of the plurality of resources, wherein the plurality of network resources link the network switch and at least one other switch.

10. A computer-readable signal-bearing medium comprising computer readable program code that performs the steps of claim 1.

11. A local switch comprising:
a receiver for receiving a plurality calls comprising at least one packet-switched call and at least one circuit-switched call;
a processor arranged and constructed to determine a measure of the plurality of calls and, based on a distribution of the measure of the plurality of calls, allocating a plurality of resources between packet-switched resources and circuit-switched resources, wherein the plurality of resources link the local switch and a network switch, and wherein the at least one circuit-switched call is allocated a first set of resources from the plurality of resources and the at least one packet-switched call is allocated a second set of resources from the plurality of resources, and wherein the first set of resources and the second set of resources are different.

12. The local switch of claim 11, wherein the processor is further arranged and constructed to determine a second measure of the plurality of calls and, based on a second distribution of the second measure of the plurality of calls, reallocating the plurality of resources between packet-switched resources and circuit-switched resources.

13. The local switch of claim 11, wherein the measure of the plurality of calls is a measure of circuit-switched traffic.

14. The local switch of claim 11, wherein the measure of the plurality of calls is a distribution of calls between circuit-switched and packet-switched.

15. The local switch of claim 11, further comprising a transmitter for sending the distribution to the network switch.

16. A network switch comprising:
a line processor, arranged and constructed to process packet-switched calls and circuit-switched calls;
a resource processor, arranged and constructed to allocate a plurality of network resources between packet-switched calls and circuit-switched calls, wherein the plurality of network resources links the network switch and at least one other switch, and wherein the circuit-switched calls are allocated a first set of resources from the plurality of resources and the packet-switched calls are allocated a second set of resources from the plurality of resources, and wherein the first set of resources and the second set of resources are different.

17. The network switch of claim 16, wherein the call processor is further arranged and constructed to receive, from another switch, a request of allocation of resources between packet-switched calls and circuit-switched calls and, based on the request, to reallocate the plurality of network resources between packet-switched calls and circuit-switched calls.

18. The method of claim 1, wherein the measure of the plurality of calls is performed periodically.

19. The method of claim 1, wherein the measure of the plurality of calls is provided on demand.

* * * * *